(12) United States Patent
Omi

(10) Patent No.: US 7,759,911 B2
(45) Date of Patent: Jul. 20, 2010

(54) SWITCHING REGULATOR WITH REVERSE CURRENT DETECTING TRANSISTOR

(75) Inventor: Masaki Omi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 453 days.

(21) Appl. No.: 11/911,238

(22) PCT Filed: Apr. 18, 2006

(86) PCT No.: PCT/JP2006/308105

§ 371 (c)(1),
(2), (4) Date: Oct. 11, 2007

(87) PCT Pub. No.: WO2006/120842

PCT Pub. Date: Nov. 16, 2006

(65) Prior Publication Data

US 2009/0091308 A1   Apr. 9, 2009

(30) Foreign Application Priority Data

May 9, 2005   (JP)   ............................. 2005-135526

(51) Int. Cl.
*G05F 1/618* (2006.01)
(52) U.S. Cl. .................... 323/222; 323/271; 323/285
(58) Field of Classification Search ................. 323/222, 323/271, 282, 283, 285
See application file for complete search history.

(56) References Cited

U.S. PATENT DOCUMENTS

| | | | |
|---|---|---|---|
| 6,798,177 B1 * | 9/2004 | Liu et al. | 323/222 |
| 6,958,595 B2 | 10/2005 | Niiyama et al. | |
| 7,638,994 B2 * | 12/2009 | Hane et al. | 323/285 |
| 2005/0007089 A1 | 1/2005 | Niiyama et al. | |
| 2008/0303493 A1 * | 12/2008 | Hu et al. | 323/271 |

FOREIGN PATENT DOCUMENTS

| | | |
|---|---|---|
| JP | 11-069804 | 3/1999 |
| JP | 11-0146637 | 5/1999 |
| JP | 2000-092824 | 3/2000 |
| JP | 2001-095241 | 4/2001 |
| JP | 2002-281743 | 9/2002 |
| JP | 2002-354822 | 12/2002 |
| JP | 3511195 | 1/2004 |
| JP | 2005-033862 | 2/2005 |

* cited by examiner

*Primary Examiner*—Jeffrey L Sterrett
(74) *Attorney, Agent, or Firm*—Fish & Richardson P.C.

(57) ABSTRACT

A switching regulator comprises a reverse current detecting transistor (P2) having a gate and a source between which a voltage across a synchronous-rectification transistor (P1) is applied. When the reverse current detecting transistor (P2) comes into an open or closed state (on-state) indicating detection of a reverse current during an on-period of the synchronous-rectification transistor (P1), the synchronous-rectification transistor (P1) is turned off even before the end of the on period.

6 Claims, 4 Drawing Sheets

SWITCHING REGULATOR WITH REVERSE CURRENT DETECTING TRANSISTOR

TECHNICAL FIELD

The present invention relates to a synchronous-rectification switching regulator (a chopper regulator) and an electronic device therewith.

BACKGROUND ART

Conventionally, as a low-heat-loss stabilized power supply which operates with comparatively high efficiency in a large input-output difference condition, switching regulators have been widely used which generate a desired output voltage from an input voltage by driving an energy storage device (a capacitor, an inductor, or the like) by performing on/off control (duty control) of an output transistor.

For switching regulators required to provide high regulating efficiency, a configuration has been adopted in which, for the purpose of minimizing the on-resistance of a rectifier device, a synchronous-rectification transistor is employed as the rectifier device and is on/off-controlled complementarily to the output transistor.

One disadvantage of the above described synchronous-rectification switching regulator is that, when its switching is controlled uniformly regardless of load variation, the amount of power lost therein is larger in a light load condition. Such an increase in power loss occurs because a lighter load permits an inductor to store a smaller amount of energy so that the energy stored in the inductor is all discharged in a period shorter than the on-period of the synchronous-rectification transistor (a period during which the synchronous-rectification transistor should be on, that is, the stored energy discharging period) and thereafter until the on-period of the synchronous-rectification transistor ends, a reverse current flows from an output terminal.

Conventionally, as a solution to the above described problem, synchronous-rectification switching regulators have been disclosed and suggested (see Patent Publication 1) which are provided with a reverse current detecting circuit for detecting a reverse current flowing toward a voltage input terminal from an intermediate connection node between an output transistor and a synchronous-rectification transistor, and when a reverse current is detected in an on-period of the synchronous-rectification transistor, the synchronous-rectification transistor is not allowed to be on at least when the next period comes during which the synchronous-rectification transistor is to be on.

Other conventional arts related to the present invention have been disclosed and proposed as exemplified by: a power supply circuit in which the on-resistances of an output transistor and of a synchronous-rectification transistor are used to detect a load current during each on-period, and when the load is found to be light based on the detection result, the synchronous-rectification transistor is turned off; and a voltage changing circuit that detects a load current according to the potential difference between the source and the drain of an output transistor right after the output transistor is turned on, and based on the detection result, switches between a PWM (pulse width modulation) control and a PFM (pulse frequency modulation) control (see Patent Publications 2 and 3).

Patent Publication 1: JP-A-2002-281743

Patent Publication 2: JP-A-H11-146637

Patent Publication 3: JP-B-3511195

DISCLOSURE OF THE INVENTION

Problems to be Solved by the Invention

It is true that the above described switching regulator is capable of preventing a reverse current in a light load condition and thereby reducing power loss.

However, the conventional art disclosed in Patent Publication 1 is designed such that, when a reverse current is detected in an on-period of a synchronous-rectification transistor, the next on-period of the synchronous-rectification transistor to come is cancelled and priority is given to storing energy into an inductor so as to prevent a reverse current from occurring again. Thus, it is not an art designed to cut off a reverse current detected in an on-period of a synchronous-rectification transistor.

Furthermore, in all the conventional arts disclosed in Patent Publications 1 to 3, as reverse current detecting means, a comparator that compares a monitoring voltage corresponding to a reverse current with a predetermined standard voltage is used, and this invites an increase in circuit scale and a signal delay (delay in the cutting off of a reverse current). Moreover, a comparator having a large circuit scale is difficult to be integrated in the vicinity of an output transistor or of a synchronous-rectification transistor, both of which have a large device size. Thus a comparator having a large circuit scale is prone to be affected by noise irrelevant to a reverse current, and hence it may deteriorate reverse-current detection accuracy in an extremely noisy environment (for example, when mounted in a mobile phone unit).

An object of the present invention is to provide: a switching regulator capable of reducing power loss in a light load condition by detecting and cutting off a reverse current with high accuracy without inviting an increase in circuit scale or a delay in the cutting off of a reverse current; and an electronic device having the switching regulator.

Means for Solving the Problem

To achieve the above object, according to one aspect of the present invention, a switching regulator generates a desired output voltage from an input voltage by driving one terminal of an energy storage device by controlling the switching of an output transistor and a synchronous-rectification transistor complementarily to each other and the switching regulator is provided with: a reverse current detecting transistor between whose gate and source a voltage across the synchronous-rectification transistor is applied; and an on-period interrupting section that turns the synchronous-rectification transistor off even before an end of an on-period of the synchronous-rectification transistor if, in the on-period of the synchronous-rectification transistor, the reverse current detecting transistor comes into an open or closed state that indicates detection of a reverse current (first configuration).

According to another aspect of the present invention, a switching regulator is a step-up switching regulator provided with: an input terminal to which an input voltage is applied via an inductor; an output terminal from which an output voltage is derived to be applied to a load; an N-channel field-effect output transistor whose drain is connected to the input terminal and whose source is grounded; a P-channel field-effect synchronous-rectification transistor whose drain is connected to the input terminal and whose source is connected to the output terminal; an error amplifier that generates an error voltage by amplifying a difference between a predetermined target voltage and a feedback voltage that varies with the output voltage; an oscillator that generates a slope voltage having a ramp waveform or a triangular waveform; a PWM comparator that compares the error voltage with the slope voltage and generates a PWM signal; a D-type flip-flop whose data input terminal is connected to a power supply line; a P-channel field-effect reverse current detection transistor whose gate is connected to the input terminal, whose source is connected to the output terminal, and whose drain is connected to a clock input terminal of the D-type flip-flop; a resistor that is connected between the clock input terminal of the D-type flip-flop and a ground node; a first inverter whose input terminal is connected to an output terminal of the PWM comparator and whose output terminal is connected to a reset input terminal of the D-type flip-flop; a second inverter whose input terminal is connected to the output terminal of the first inverter and whose output terminal is connected to a gate of the output transistor; and an OR circuit one input terminal of which is connected to an output terminal of the D-type flip-flop, another input terminal of which is connected to the output terminal of the second inverter, and whose output terminal is connected to a gate of the synchronous-rectification transistor (second configuration).

With this configuration, it is possible to detect whether or not a reverse current is occurring by using a single transistor device. This makes it possible to reduce power loss in a light load condition by detecting and cutting off a reverse current with high accuracy without inviting an increase in circuit scale or a delay in the cutting off of the reverse current.

According to the present invention, in a switching regulators having the first or second configuration described above, the reverse current detecting transistor may be integrated and arranged adjacent to the synchronous-rectification transistor (third configuration). With this configuration, the reverse current detecting transistor is less likely to be adversely affected by irrelevant noise in performing a reverse current detecting operation, and thus a stable reverse current detecting operation can be achieved even in a noisy environment.

According to another aspect of the present invention, an electronic device of the present invention is provided with a switching regulator having one of the first to third configurations described above as output-converting means for converting an output from a device power source. The device power source may be a battery. With this configuration, it is possible to prevent waste of the battery and thereby to prolong its operating life.

ADVANTAGES OF THE INVENTION

As described above, a switching regulator according to the present invention makes it possible to reduce power loss in a light load condition with high accuracy without inviting an increase in circuit scale, thereby reducing power consumption of an electric device incorporating the switching regulator.

LIST OF REFERENCE SYMBOLS 10 battery
20 DC/DC converter (switching regulator)
30 TFT liquid crystal panel
21 switching power supply IC
211 switch driving circuit
212 output feedback circuit
CTRL switching control section
N1 N-channel field-effect transistor (output transistor)
P1 P-channel field-effect transistor (synchronous-rectification transistor)
P2 P-channel field-effect transistor (reverse current detecting transistor)
INV 1, INV 2 inverter
FF D-type flip-flop
OR OR circuit
ERR error amplifier
E1 DC voltage source
OSC oscillator
CMP comparator
T1 to T3 external terminal
Lex inductor (externally-fitted)
Cex smoothing capacitor (externally-fitted)
Rex 1, Rex 2 resistor (externally-fitted)

BEST MODE FOR CARRYING OUT THE INVENTION

The following description discusses examples of how the present invention is applied to a DC/DC converter that is incorporated in a mobile phone unit for the purpose of converting the output voltage of a battery to generate a voltage for driving different parts (for example, a TFT (thin film transistor) liquid crystal panel) of the mobile phone unit.

Figure 1:
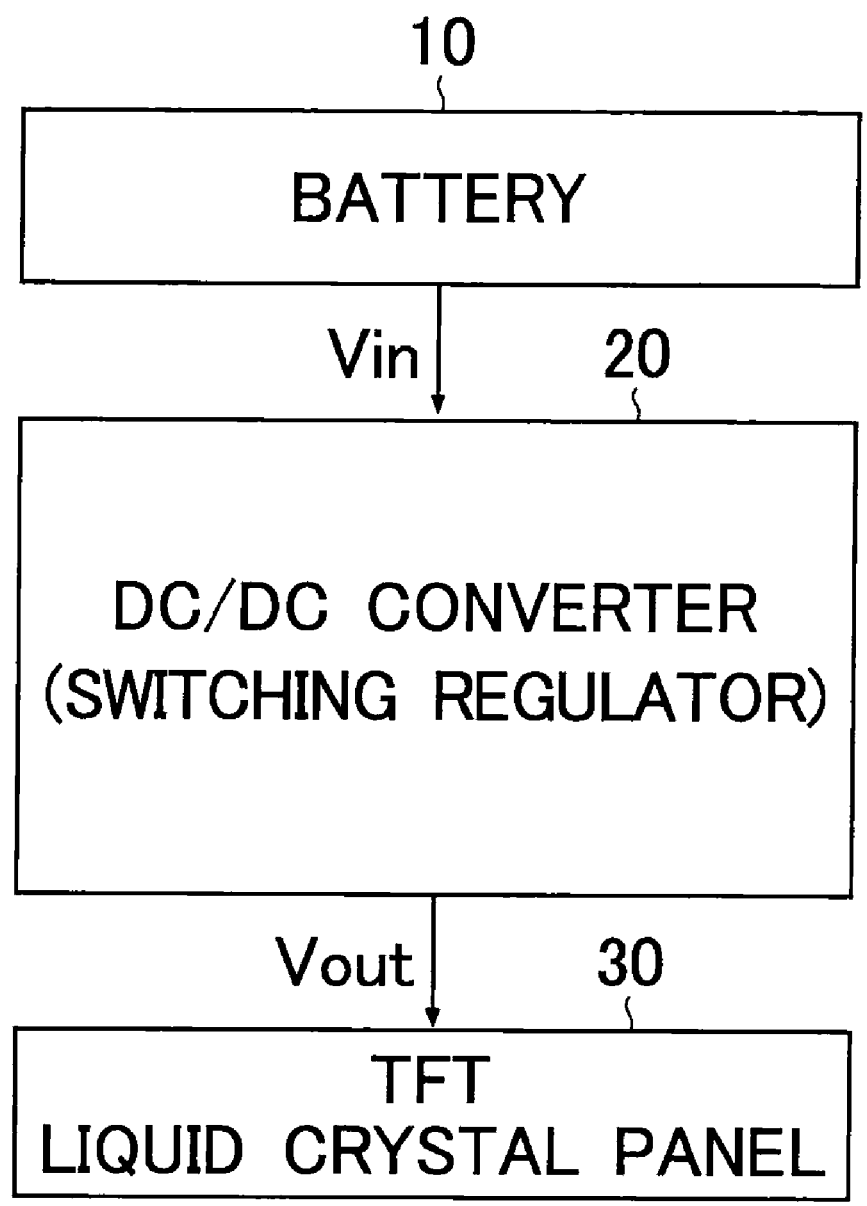
FIG. 1 A block diagram showing a mobile phone unit embodying the present invention.

FIG. 1 is a block diagram showing a mobile phone unit embodying the present invention (in particular, a power supply system for a TFT liquid crystal panel). As shown in the figure, the mobile phone unit of this embodiment is provided with: a battery 10 serving as a device power source; a DC/DC converter 20 serving as output-converting means for converting the output of the battery 10; and a TFT liquid crystal panel 30 serving as display means of the mobile phone unit. It should be understood that the mobile phone unit of this embodiment is provided with, in addition to the above mentioned components, unshown components such as a transmitter-receiver circuit section, a speaker section, a microphone section, a display section, an operation section, and a memory section, as means for realizing its essential functions (e.g., for communication).

The DC/DC converter 20 generates a constant output voltage Vout from an input voltage Vin applied from the battery 10 and feeds the output voltage Vout to the TFT liquid crystal panel 30.

Figure 2:
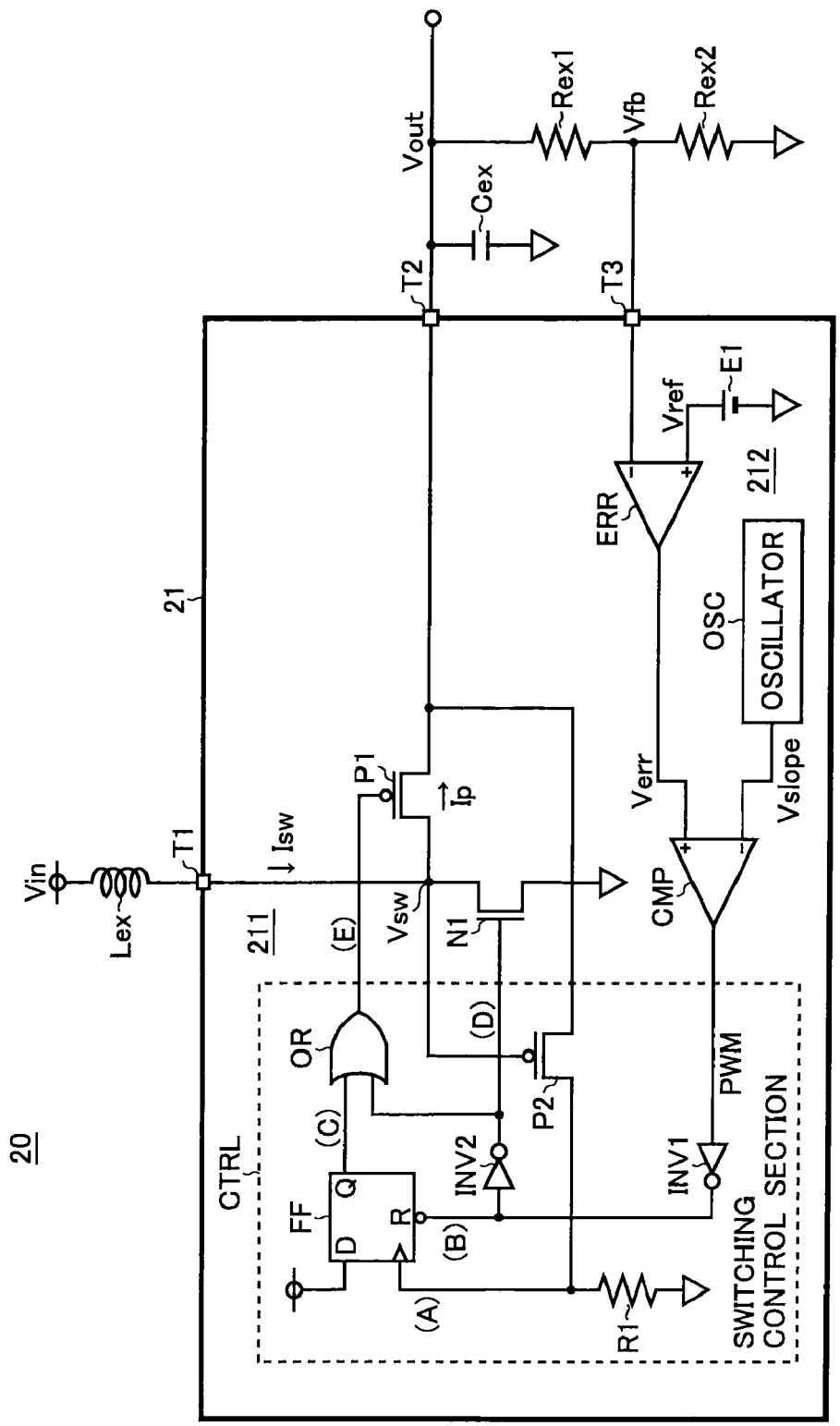
FIG. 2 A circuit diagram showing an example of the configuration of a DC/DC converter 20.

FIG. 2 is a circuit diagram (partly presented as a block diagram) showing an example of the configuration of the DC/DC converter 20. As shown in the figure, the DC/DC converter 20 of this embodiment is a step-up switching regulator having, in addition to a switching power supply IC 21, an externally-fitted inductor Lex, an externally-fitted smoothing capacitor Cex, and externally-fitted resistors Rex1 and Rex 2.

The switching power supply IC 21 includes a switch driving circuit 211 and an output feedback circuit 212 as circuit blocks, and also includes external terminals T1 to T3 as external electrical connection means. In the switching power supply IC 21, in addition to the above mentioned circuit blocks, a protection circuit block (a low-input-voltage malfunction prevention circuit, a heat protection circuit, or the like) may be incorporated as necessary.

The switch driving circuit 211 has an N-channel field-effect transistor N1, a P-channel field-effect transistor P1, and a switching control section CTRL. The switching control section CTRL has a P-channel field-effect transistor P2, inverters INV1 and INV2, a D-type flip-flop FF, an OR circuit OR, and a resistor R1.

The output feedback circuit 212 has an error amplifier ERR, a DC voltage source E1, an oscillator OSC, and a comparator CMP.

The drain of the transistor N1 is connected to the external terminal T1 (an input terminal). The source of the transistor N1 is grounded.

The drain of the transistor P1 is connected to the external terminal T1. The source of the transistor P1 is connected to the external terminal T2 (output terminal).

The inverting input terminal (−) of the error amplifier ERR is connected to the external terminal T3 (output feedback terminal). The non-inverting input terminal (+) of the error amplifier ERR is connected to the positive terminal of the DC voltage source E1. The negative terminal of the DC voltage source E1 is grounded. The non-inverting input terminal (+) of the comparator CMP is connected to the output terminal of the error amplifier ERR. The inverting input terminal (−) of the comparator CMP is connected to the output terminal of the oscillator OSC.

In the switching control section CTRL, the drain of the transistor P2 is grounded via the resistor R1 and is also connected to the clock input terminal of the flip-flop FF. The source of the transistor P2 is connected to the external terminal T2. The gate of the transistor P2 is connected to the external terminal T1. The input terminal of the inverter INV1 is connected to the output terminal of the comparator CMP and serves as the PWM signal input terminal of the switching control section CTRL. The output terminal of the inverter INV1 is connected to the reset input terminal of the flip-flop FF and is connected to the input terminal of the inverter INV2. The output terminal of the inverter INV2 is connected to the gate of the transistor N1 so as to serve as the first control signal output terminal of the switching control section CTRL and is also connected to one input terminal of the OR circuit OR. The data input terminal of the flip-flop FF is connected to the power supply line. The output terminal of the flip-flop FF is connected to another input terminal of the OR circuit OR. The output terminal of the OR circuit OR is connected to the gate of the transistor P1 and serves as the second control signal output terminal of the switching control section CTRL.

Outside the switching power supply IC 21, the external terminal T1 is connected, via the inductor Lex, to an input voltage application node to which the input voltage Vin is applied from the battery 10. The external terminal T2 is grounded via the smoothing capacitor Cex and is also grounded via the resistors Rex 1 and Rex 2. Furthermore, the external terminal T2 is also connected to the output voltage Vout deriving node (power input terminal of the TFT liquid crystal panel 30, which is a load). The external terminal T3 is connected to the connection node between the resistors Rex 1 and Rex 2.

First, a description will be given of the basic operation (DC/DC converting operation) of the switching power supply IC 21 configured as described above.

In the switch driving circuit 211, the transistor N1 is an output transistor of which the switching is controlled by the switching control section CTRL, and the transistor P1 is a synchronous-rectification transistor of which the switching is controlled by the switching control section CTRL. The switching control section CTRL controls the switching of the transistors N1 and P1 complementarily to each other for the purpose of generating the output voltage Vout by stepping-up the input voltage Vin.

It should be understood that the term "complementarily" used in this specification covers not only cases where the turning on and off of the transistor N1 takes place exactly oppositely to that of the transistor P1 but also cases where, from the perspective of preventing a through current and out of other considerations, the turning on and off of the transistor N1 takes place oppositely to but with a predetermined delay relative to that of the transistor P1.

When the transistor N1 is turned on, a switch current Isw flows through the inductor Lex toward the ground end via the transistor N1, and thus the electric energy of the switch current Isw is stored in the inductor Lex. During an on-period of the transistor N1, if the smoothing capacitor Cex has already been charged, a current flows through the load (the TFT liquid crystal panel 30, which is not shown in the figure) from the smoothing capacitor Cex. In this state, the transistor P1, which is a synchronous-rectification device, is turned off complementarily to the on-state of the transistor N1, and hence no current flows into the transistor N1 from the smoothing capacitor Cex.

On the other hand, when the transistor N1 is turned off, a counter electromotive voltage appears in the inductor Lex to discharge the electric energy stored therein. In this state, the transistor P1 is turned on complementarily to the off-state of the transistor N1, and thus the current Ip that flows from the external terminal T1 via the transistor P1 flows into the TFT liquid crystal panel 30, which is a load. The current Ip also flows into the ground node via the smoothing capacitor Cex, and thus the smoothing capacitor Cex is charged. Through the repetition of the above described operation, a DC output smoothed by the smoothing capacitor Cex is supplied to the TFT liquid crystal panel 30, which is a load.

Thus, the switching power supply IC 21 of this embodiment functions as a component of a chopper-type step-up circuit which drives an inductor Lex, which is an energy storage device, by switching-controlling transistors N1 and P1 and thereby steps up an input voltage Vin to generate an output voltage Vout.

Next, a description will be given of the output feedback control of the switching power supply IC 21 configured as described above.

In the output feedback circuit 212, the error amplifier ERR amplifies the difference between an output feedback voltage Vfb (corresponding to the actual value of the output voltage Vout) which is derived from the connection node between the externally-fitted resistors Rex 1 and Rex 2 and a reference voltage Vref (corresponding to the target value Vtarget of the output voltage Vout) which is generated at the DC voltage source E1, and thereby generates an error voltage signal Verr. Specifically, the further the value of the output voltage Vout is lower than the target value Vtarget, the higher the voltage level of the error voltage signal Verr is. On the other hand, the oscillator OSC generates a slope voltage signal Vslope having a ramp waveform (sawtooth waveform). The slope voltage signal Vslope may be a voltage signal having a triangular waveform.

The comparator CMP is a PWM comparator which generates a PWM (pulse width modulation) signal by comparing the error voltage signal Verr and the slope voltage signal Vslope. Hence, the on-duty of the PWM signal (the rate of the on-period of the transistor N1 per unit period) continuously changes according to the difference between the error voltage signal Verr and the slope voltage signal Vslope. More specifically, the lower the value of the output voltage Vout is than the target value Vtarget, the larger the on-duty of the PWM signal is, and the closer the value of the output voltage Vout is to the target value Vtarget, the smaller the on-duty of the PWM signal is.

The switching control section CTRL, when the input voltage Vin is stepped up to generate the output voltage Vout, controls the switching of the transistors N1 and P1 complementarily to each other in response to the PWM signal. More specifically, the switching control section CTRL keeps the transistor N1 on and the transistor P1 off during an on-period of the PWM signal, and keeps the transistor N1 off and the transistor P1 on during an off-period of the PWM signal.

Thus, the switching power supply IC 21 of this embodiment is capable of keeping the output voltage Vout equal to its target value Vtarget by performing output feedback control based on the error voltage signal Verr.

Figure 3A:
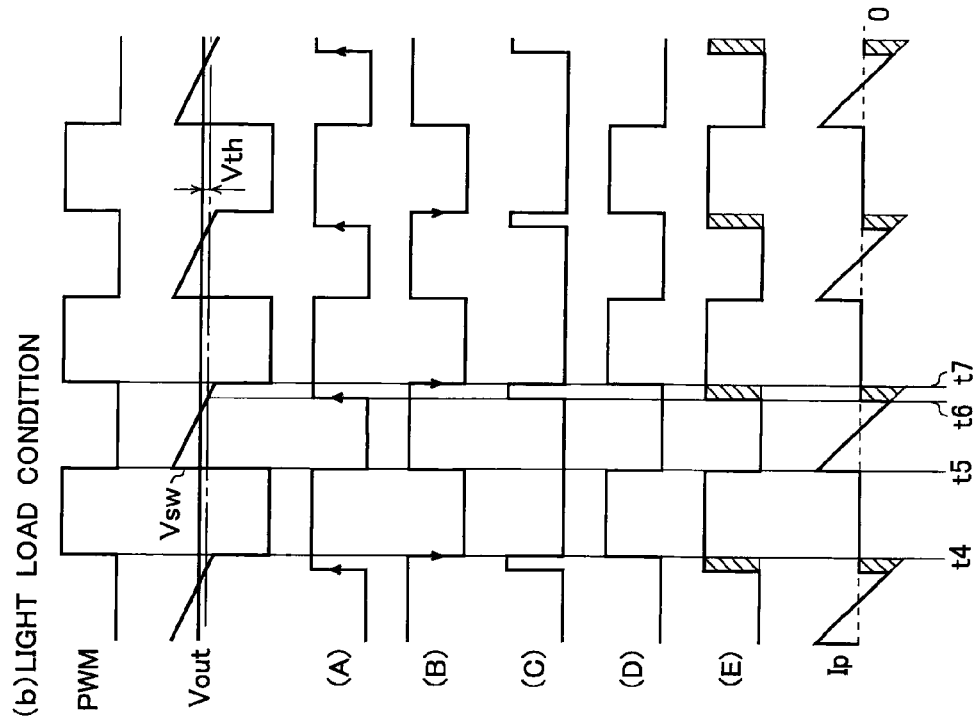
FIG. 3A and FIG. 3B Diagrams illustrating an example of the reverse current preventing operation in the switching power supply IC 21.
Figure 3B:
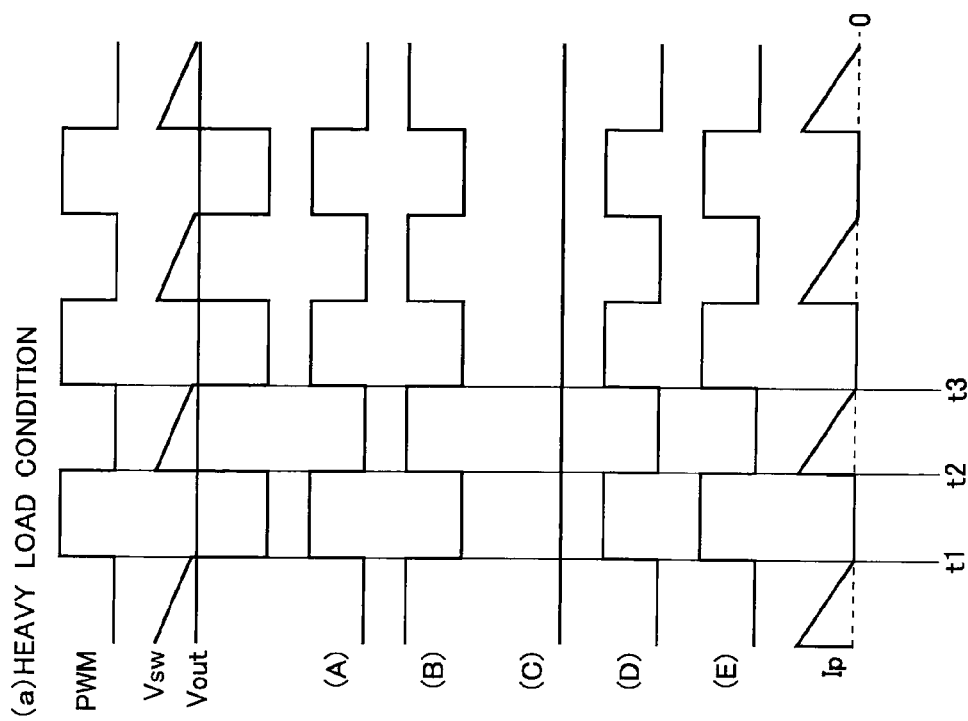

Next, a detailed description will be given of the reverse current prevention operation of the switching power supply IC 21 configured as described above, with reference to FIGS. 3A and 3B. FIGS. 3A and 3B are diagrams each illustrating an example of reverse current prevention operation performed by the switching power supply IC 21, FIG. 3A showing a case in a heavy load condition and FIG. 3B showing a case in a light load condition.

In FIGS. 3A and 3B, the symbols (A) to (E) denote the voltage waveforms appearing at points (A) to (E) shown in FIG. 2, respectively. More specifically, the symbol (A) denotes the clock signal of the flip-flop FF, and the logic level of the clock signal is changed according to the open/closed state of the transistor P2, which is reverse current detection means. The symbol (B) denotes the reset signal of the flip-flop FF, and the logic level of the reset signal is derived from the PWM signal via a logic level inversion by the inverter INV1 and thus is opposite to the logic level of the PWM signal. The symbol (C) denotes the output signal of the flip-flop FF, and the logic level of the output signal is turned high at a rising edge of the clock signal (A) and is turned low at a falling edge of the reset signal (B). The symbol (D) denotes the gate signal of the transistor N1, and the logic level of the gate signal is derived from the PWM signal via two logic level inversions by the inverter INV1 and the inverter INV2 and thus is the same as the logic level of the PWM signal. The symbol (E) denotes the gate signal of the transistor P1, and the logic level of the gate signal is decided by the OR operation at the OR circuit OR such that it is high if at least one of the signals (C) and (D) is high and it is low if both of the signals (C) and (C) are low.

In FIGS. 3A and 3B, the symbols PWM, Vsw, and Vout denote the voltage waveforms of the PWM signal, the switch voltage Vsw (the voltage that appears at the external terminal T1), and the output voltage Vout shown in FIG. 2, respectively, and the symbol Ip denotes the current waveform of the current Ip shown in FIG. 2.

First, a detailed description will be given of the operation in a heavy load condition, with reference to FIG. 3A.

During the period from time t1 to time t2, the PWM signal is kept high, and thus not only the gate signal (D) of the transistor N1 but also the gate signal (E) of the transistor P1 is high, regardless of the logic level of the output signal (C) of the flip-flop FF. As a result, during the period from time t1 to time t2, the transistor N1 is kept on and the transistor P1 is kept off, and electric energy is stored in the inductor Lex.

During this period, the flip-flop FF remains reset by the reset signal (B) which is low and the logic level of the output signal (C) is kept low.

In the period from time t2 to time t3, first the PWM signal is turned low, and thus the reset signal (B) of the flip-flop FF is turned back high, cancelling the reset state of the flip-flop FF. During this period, the switch voltage Vsw is kept higher than the output voltage Vout, and thus the transistor P2 is continuously kept off (in a reverse current non-detecting state). Hence, the clock signal (A) of the flip-flop FF is kept low via the resistor R1, and also the output signal (C) and consequently the gate signal (E) of the transistor P1 are kept low. As a result, during the period from time t2 to time t3, the transistor N1 is kept off and the transistor P1 is kept on, and electric energy is discharged from the inductor Lex.

In this way, in a heavy load condition, DC/DC conversion operation is performed completely in the conventional manner.

Next, a detailed description will be given of the operation in a light load condition with reference to FIG. 3B.

During the period from time t4 to time t5, the PWM signal is kept high, and thus, as in a heavy load condition, not only the gate signal (D) of the transistor N1 but also the gate signal (E) of the transistor P1 is high, regardless of the logic level of the output signal (C) of the flip-flop FF. As a result, during the period from time t4 to time t5, the transistor N1 is kept on and the transistor P1 is kept off, and electric energy is stored in the inductor Lex. During this period, the flip-flop FF remains reset by the reset signal (B) which is low and the logic level of the output signal (C) is kept low.

At time t5, the logic level of the PWM signal is turned low, and thus the reset signal (B) of the flip-flop FF is turned back high, cancelling the reset state of the flip-flop FF. Here, at time t5, immediately after the logic level is changed, since the inductor Lex has electric energy stored therein, the switch voltage Vsw is higher than the output voltage Vout, and thus the transistor P2 is off (in a reverse current non-detecting state). Hence, the clock signal (A) of the flip-flop FF is kept low via the resistor R1, and also the output signal (C) and consequently the gate signal (E) of the transistor P1 are kept low. As a result, immediately after time t5, as in a heavy load condition, the transistor N1 is turned off and the transistor P1 is turned on, and electric energy is discharged from the inductor Lex.

However, in a light load condition, the amount of electric energy stored in the inductor Lex is small, and thus all the stored electric energy is discharged in a period shorter than the on-period of the transistor P1 (i.e., the period from time t5 to time t7, during which the PMW signal is kept low). After the switch voltage Vsw drops below the output voltage Vout until the on-period of the transistor P1 ends, a reverse current keeps flowing as the current Ip from the output terminal T2.

Here, the above mentioned reverse current causes the switch voltage Vsw to fall even further, and at time t6, when the switch voltage Vsw falls below the output voltage Vout by a predetermined threshold voltage Vth (a potential difference between the gate and the source of the transistor P2 necessary to turn the transistor P2 on), the transistor P2 is turned on (in a reverse current detecting state). Thus, the level of the clock signal (A) of the flip-flop FF is raised to be as high as the output voltage Vout via the transistor P2, and a data signal at the rising edge of the clock signal (A) (hence at a high level) is obtained as the output signal (C). As a result, the gate signal (E) of the transistor P1 is turned high regardless of the logic level of the PWM signal (more directly, the logic level of the gate signal (D)), and the transistor P1 is turned off before the end of its on-period, and thus the current Ip flowing in a reverse direction from the load is cut off (see the hatched portions in the figure).

When, at time t7, the PWM signal is changed to a high level, the flip-flop FF is reset by the low-level reset signal (B), and as in the previously described period from time t4 to time t5, the transistor N1 is turned on, the transistor P1 is turned off, and thus electric energy is stored in the inductor Lex.

As described above, the DC/DC converter 20 of this embodiment includes: as reverse current detection and cutting-off means, the transistor P2 between whose gate and source the voltage across the transistor P1 is applied; and an on-period interruption section (the flip-flop FF, the resistor R1, the inverters INV1 and INV2, and the OR circuit OR) that, if the transistor P2, during an on-period of the transistor P1, comes into an open or closed state indicating detection of a reverse current (on-state), turns the transistor P2 off before the end of the on-period of the transistor P2.

With this configuration, it is possible to detect with a single transistor whether or not a reverse current is occurring, and this makes it possible to achieve a highly accurate detection and a cutoff of a reverse current without inviting an increase in circuit scale or a delay in the cutting off of the reverse current, and thereby to reduce power loss in a light load condition.

Figure 4:
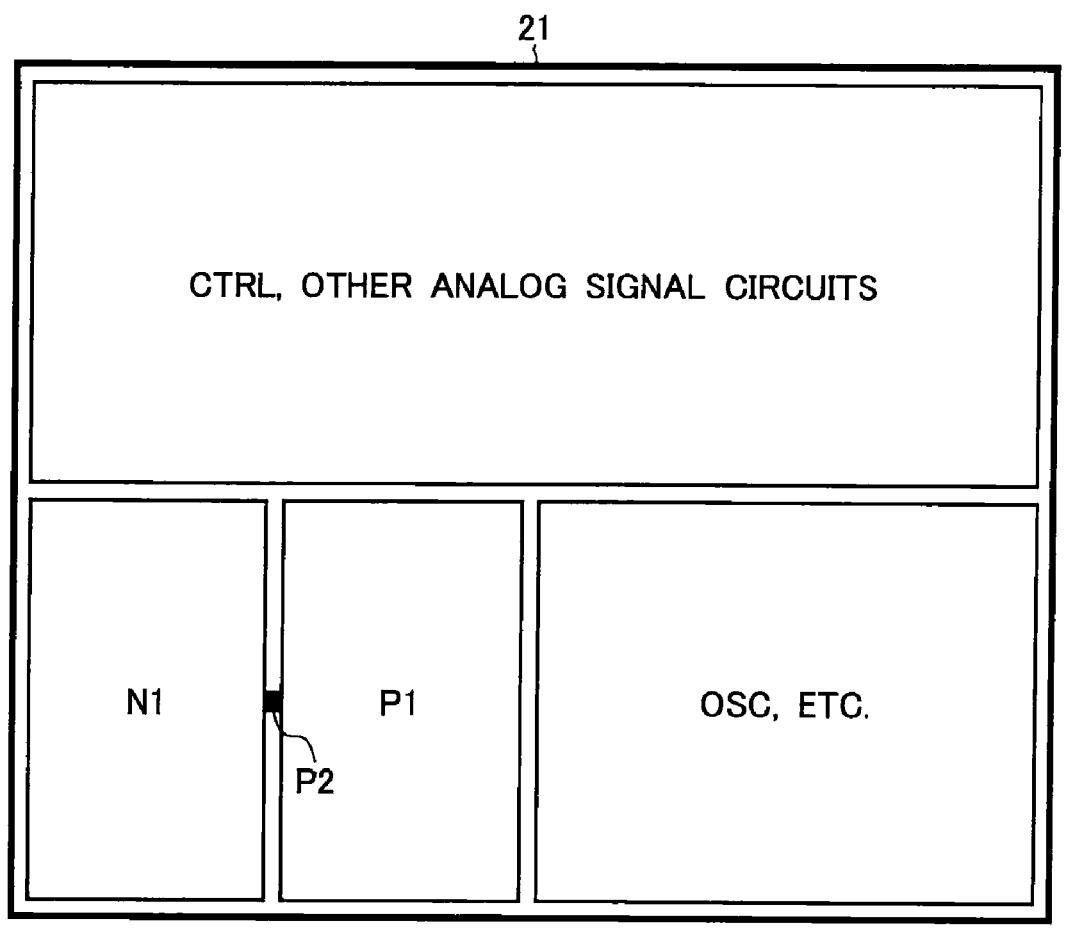
FIG. 4 A diagram showing an example of the device layout of the switching power supply IC 21.

Finally, a detailed description will be given of the device layout of the switching power supply IC 21 configured as described above with reference to FIG. 4. As shown in the figure, the reverse current detecting transistor P2 is integrated and arranged adjacent to the transistors N1 and P1. With this configuration, the reverse current detecting transistor P2 is less likely to be adversely affected by irrelevant noise in performing a reverse current detection, and thus a stable detection of a reverse current can be achieved even in a noisy environment. Particularly, in a device layout in which the transistor P2 is sandwiched between (or enclosed by) the transistors N1 and P1, the transistors N1 and P1 serve as noise interference devices, and this helps prevent noise from affecting the transistor P2 and thereby achieve a reverse current detection with improved accuracy. In addition, the reverse current detecting transistor P2 can be arranged in the vicinity of the external terminals T1 and T2, and this helps achieve less susceptibility to noise.

In the embodiment described above, it is assumed that the present invention is applied to a DC/DC converter that is incorporated in a mobile phone unit. This, however, is not meant to limit the application of the present invention to such an embodiment. It should be understood that the present invention is applicable to DC/DC converters in general that are incorporated in other electronic devices.

In the embodiment described above, it is assumed that the present invention is applied to a step-up switching regulator. This, however, is not meant to limit the application of the present invention to such an embodiment. It should be understood that the present invention is applicable to a step-down or a step-up/down regulator.

The present invention may be practiced with various modifications and variations made otherwise than specifically described above within the spirit of the invention. For example, a plurality of field-effect transistors may be used instead of a single field-effect transistor as an output transistor, as a synchronous-rectification transistor, or as a reverse current detecting transistor.

INDUSTRIAL APPLICABILITY

The present invention provides technology that is useful for improving the regulating efficiency of a synchronous-rectification switching regulator and can be suitably used to reduce power consumption of electronic devices in general (particularly battery-operated ones).

What is claimed is:

1. A switching regulator operable to generate a desired output voltage from an input voltage by driving one terminal of an energy storage device by controlling switching of an output transistor and a synchronous-rectification transistor complementarily to each other, the switching regulator comprising:
   a reverse current detecting transistor between whose gate and source a voltage across the synchronous-rectification transistor is applied; and
   an on-period interruption section to turn the synchronous-rectification transistor off even before an end of an on-period of the synchronous-rectification transistor if, during the on-period of the synchronous-rectification transistor, the reverse current detecting transistor comes into an open or closed state that indicates detection of a reverse current.

2. A step-up switching regulator comprising:
   an input terminal to which an input voltage is applied via an inductor;
   an output terminal from which an output voltage is derived to be applied to a load;
   an N-channel field-effect output transistor whose drain is connected to the input terminal and whose source is connected to a ground node;
   a P-channel field-effect synchronous-rectification transistor whose drain is connected to the input terminal and whose source is connected to the output terminal;
   an error amplifier to generate an error voltage by amplifying a difference between a predetermined target voltage and a feedback voltage that varies with the output voltage;
   an oscillator to generate a slope voltage having a ramp waveform or a triangular waveform;
   a PWM comparator to compare the error voltage with the slope voltage and generates a PWM signal;
   a D-type flip-flop whose data input terminal is connected to a power supply line;
   a P-channel field-effect reverse current detecting transistor whose gate is connected to the input terminal and whose source is connected to the output terminal, the drain of the P-channel field-effect reverse current being connected to a clock input terminal of the D-type flip-flop;
   a resistor that is connected between the clock input terminal of the D-type flip-flop and a ground node;
   a first inverter whose input terminal is connected to an output terminal of the PWM comparator and whose output terminal is connected to a reset input terminal of the D-type flip-flop;
   a second inverter whose input terminal is connected to the output terminal of the first inverter and whose output terminal is connected to a gate of the output transistor; and
   an OR circuit one input terminal of which is connected to an output terminal of the D-type flip-flop, another input terminal of which is connected to the output terminal of the second inverter, and whose output terminal is connected to a gate of the P-channel field-effect synchronous-rectification transistor.

3. The switching regulator of claim 2, wherein the reverse current detecting transistor is integrated and arranged adjacent to the synchronous-rectification transistor.

4. An electronic device comprising a switching regulator for converting an output from a device power source, the switching regulator operable to generate a desired output voltage from an input voltage by driving one terminal of an energy storage device by controlling switching of an output transistor and a synchronous-rectification transistor complementarily to each other, the switching regulator comprising:
- a reverse current detecting transistor between whose gate and source a voltage across the synchronous-rectification transistor is applied; and
- an on-period interruption section to turn the synchronous-rectification transistor off even before an end of an on-period of the synchronous-rectification transistor, if, during the on-period of the synchronous-rectification transistor, the reverse current detecting transistor comes into an open or closed state that indicates detection of a reverse current.

5. An electronic device comprising a switching regulator for converting an output from a device power source, the switching regulator comprising:
- an input terminal to which an input voltage is applied via an inductor;
- an output terminal from which an output voltage is derived to be applied to a load;
- an N-channel field-effect output transistor whose drain is connected to the input terminal and whose source is connected to a ground node;
- a P-channel field-effect synchronous-rectification transistor whose drain is connected to the input terminal and whose source is connected to the output terminal;
- an error amplifier to generate an error voltage by amplifying a difference between a predetermined target voltage and a feedback voltage that varies with the output voltage;
- an oscillator to generate a slope voltage having a ramp waveform or a triangular waveform;
- a PWM comparator to compare the error voltage with the slope voltage and generates a PWM signal;
- a D-type flip-flop whose data input terminal is connected to a power supply line;
- a P-channel field-effect reverse current detecting transistor whose gate is connected to the input terminal and whose source is connected to the output terminal, the drain of the P-channel field-effect reverse current detecting transistor being connected to a clock input terminal of the D-type flip-flop;
- a resistor that is connected between the clock input terminal of the D-type flip-flop and a ground node;
- a first inverter whose input terminal is connected to an output terminal of the PWM comparator and whose output terminal is connected to a reset input terminal of the D-type flip-flop;
- a second inverter whose input terminal is connected to the output terminal of the first inverter and whose output terminal is connected to a gate of the output transistor; and
- an OR circuit one input terminal of which is connected to an output terminal of the D-type flip-flop, another input terminal of which is connected to the output terminal of the second inverter, and whose output terminal is connected to a gate of the P-channel field-effect synchronous-rectification transistor.

6. The electric device of claim 5, wherein the device power source is a battery.

\* \* \* \* \*